March 29, 1927.
J. H. McMANUS
1,622,462
FOLDING BED FOR AUTOMOBILES
Filed Aug. 18, 1924
2 Sheets-Sheet 1
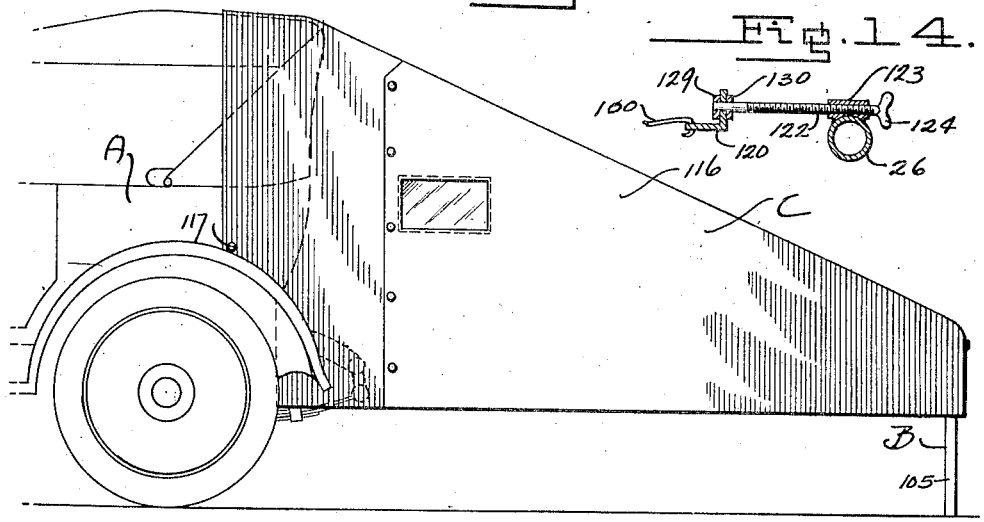
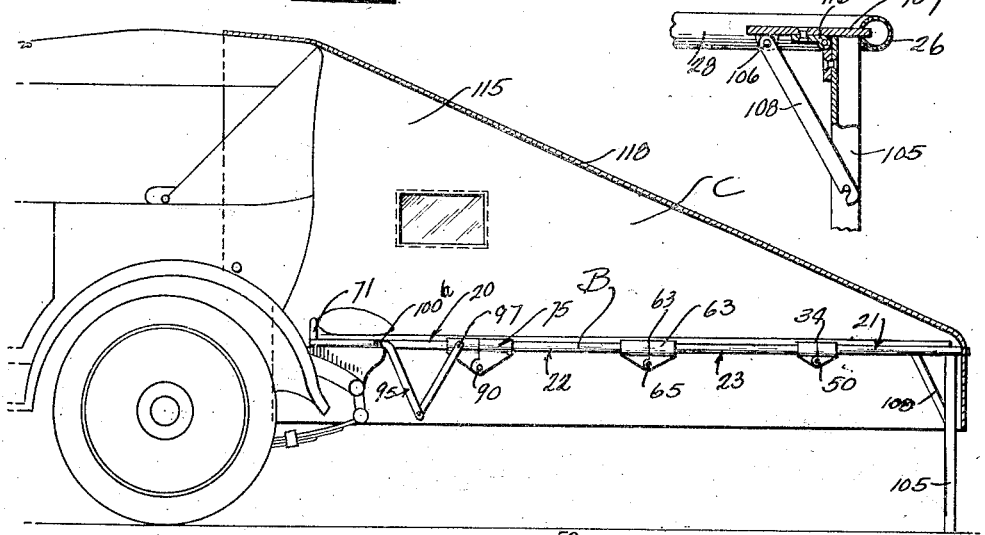
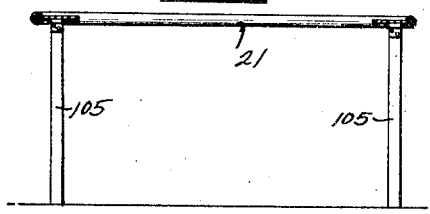
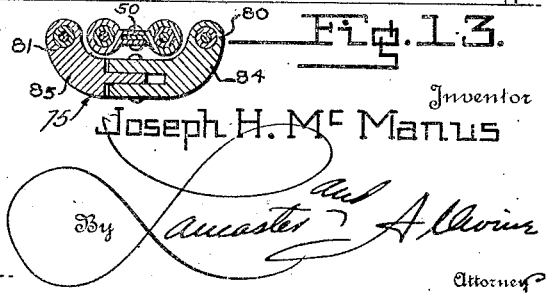
Inventor
Joseph H. McManus
By Lancaster and A. Olvins
Attorney

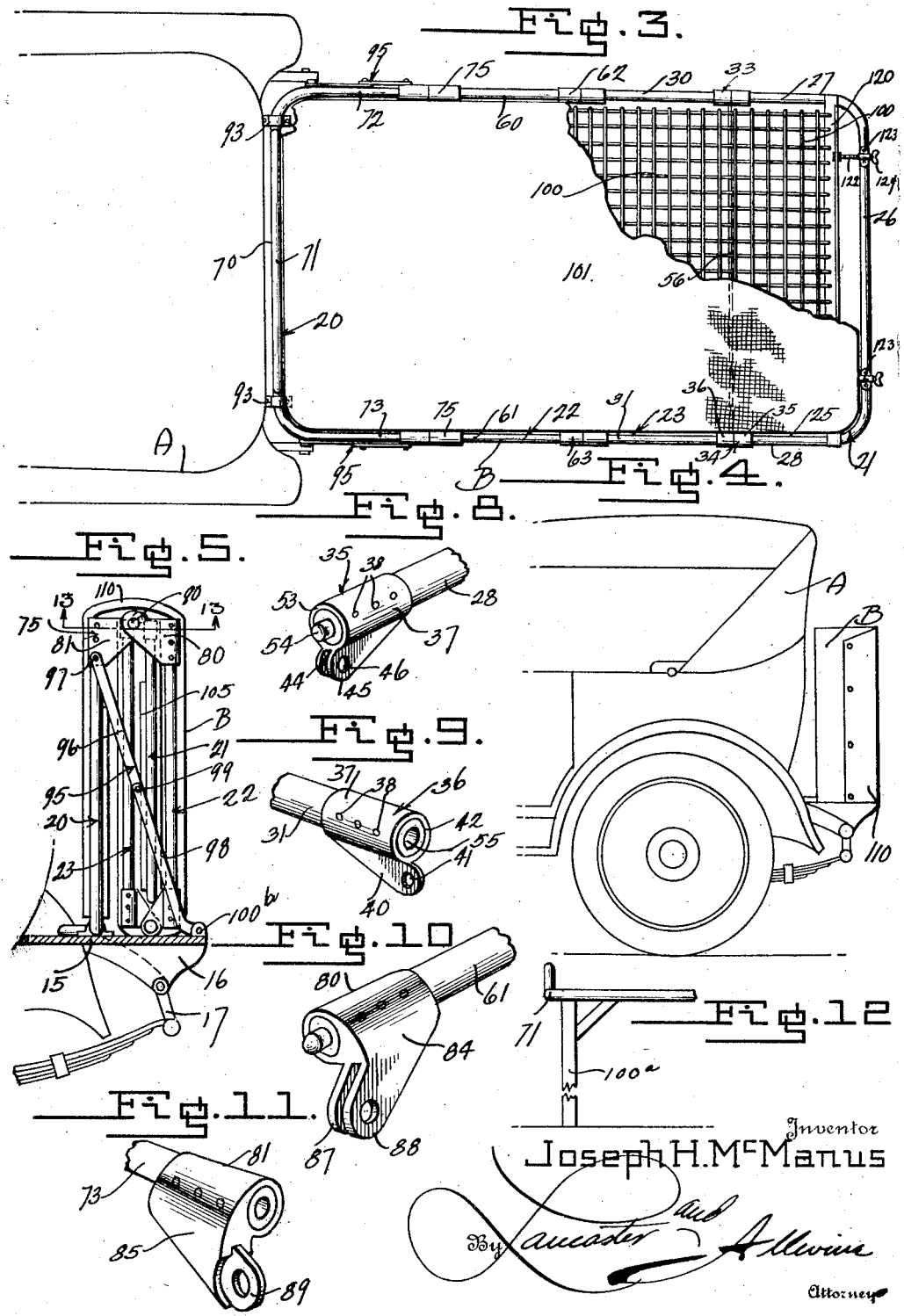

Patented Mar. 29, 1927.

1,622,462

UNITED STATES PATENT OFFICE.

JOSEPH H. McMANUS, OF POWER, MONTANA.

FOLDING BED FOR AUTOMOBILES.

Application filed August 18, 1924. Serial No. 732,856.

This invention relates to improvements in folding beds for automotive vehicles, such as are desirable for use when touring.

A primary object of the invention is the provision of a relatively simple and compact type of folding bed, which may be collapsed into an out of the way relation upon an automotive vehicle, such as on a rear platform thereof, and which may be extended into a very stable and efficient relation rearwardly of the vehicle.

A further object of this invention is the provision of novel means for hingedly connecting sections of the folding bed together.

Other objects and advantages of this invention will be apparent during the course of the following detailed description.

In the accompanying drawings, forming a part of this specification, and wherein similar reference characters designate corresponding parts throughout the several views, Figure 1 is a side elevation showing the covered extensions of the bed and its relation with respect to the automotive vehicle to which it is attached.

Figure 2 is a longitudinal cross sectional view taken through the extended folding bed, showing its relation with respect to a vehicle to which it is attached.

Figure 3 is a fragmentary plan view of the bed in its extended relation with respect to a vehicle to which it is attached.

Figure 4 is a fragmentary view of the rear portion of a vehicle showing the bed as collapsed upon the vehicle, simulating the ordinary luggage carrier at the rear of automobiles.

Figure 5 is a cross sectional view taken through the improved bed in its collapsed relation upon the rear structure of a vehicle.

Figure 6 is a cross sectional view showing cetrain supporting means provided for the bed.

Figure 7 is a fragmentary cross sectional view showing certain leg supporting means for the bed.

Figures 8, 9, 10 and 11 are perspective views of details of hinge structures provided for sections of the folding bed.

Figure 12 is a fragmentary view showing a leg arrangement which may be used when it is not desired to support the bed from a portion of the vehicle, and Figure 13 is a cross sectional view taken through the folding bed structure, substantially on the line 13—13 of Figure 5, and showing the relation of the hinge details.

Figure 14 is a cross sectional view taken through tightening means for the bed spring.

In the drawings, wherein for the purpose of illustration is shown the collapsible bed and its related details, the letter A may generally designate an automotive vehicle or any approved type of vehicle, to which the improved collapsible bed B is connected. A covering C may be provided for connection to the vehicle, over the folding bed B when it is extended, and substantially as is illustrated in Figures 1 and 2 of the drawings.

The automotive vehicle A is of course any approved type, and in the preferred instance the folding bed B will be supported rearwardly of the automotive vehicle, A, although it is contemplated to support the folding bed at the side of the vehicle on the running board, if necessary. In the preferred instance, however, a platform 15 will be provided in a horizontal plane at the rear of the automotive vehicle, suitably supported by any approved bracket 16 which may be connected with the spring or analogous structure 17 of the vehicle.

The improved folding bed B consists in the preferred instance of four sections, namely, a head section 20; foot section 21; and intermediate sections 22 and 23.

While the sections are of simple formation, they are connected in a novel manner so that they will fold into a compact novel relation. To this end the foot section 21 includes the substantially U-shaped frame member 25, which consists of the foot rail 26 and the relatively short side rails 27 and 28, which extend in parallel relation at opposite sides of the bed. The rail portions 26, 27 and 28 are of one piece formation, and connect with each other by bends which are arcuated on relatively long radii. The intermediate section 23 includes the straight side rail portions 30 and 31, which are of tubular formation, preferably of the same diameter as the tubular material from which the section 21 is made. The bed sections 21 and 23, at the rails 30 and 27, are connected by a hinge 33, and the rails 31 and 28 are similarly connected by a like hinge 34. The structure of the hinges 33 and 34 is illustrated in Figures 8 and 9 of the drawings, wherein the details of the hinge 34 are shown as consisting of portions 35 and 36 connected respectively to the rails 28 and 31 by means of substantially hollow cylindrical portions 37, through which the tubular rails 28 and 31 are slipped, and riveted thereto, as by rivets 38. The hinge portion 36 is preferably provided with a depending lug or extension 40, having an aperture 41 therethrough outwardly of the flush edges 42 of the hinge and rail portions 31 and 36. The hinge portion 35 includes a pair of depending lugs 44 and 45, havng aligning apertures 46 therein; the space between the lugs 44 and 45 being provided for receiving the lug 40 of the hinge portion 36, so that a bolt 50 may pivotally connect the hinge portions 35 and 36. The pivot point as provided by this bolt 50, when the sections 21 and 23 are in extended relation lies below the plane of the sections, and when so extended the facing edges 42 and 53 of the hinges and rails of the sections 21 and 23 will be in abutment. It is preferred to provide tubular extensions 54 upon ends of the rails 27 and 28, which may seat in socket openings 55 provided in the facing ends of the rails 30 and 31 of the intermediate section 23. This serves to mantain the rails of the sections in alignment when the bed sections are in extended relation. If desired a cross brace 56 may be employed for connection between the pivot parts of the hinges 33 and 34.

The intermediate section 22 of the bed is practically similar to the intermediate section 23, and includes the straight side rails 60 and 61, which are respectively connected by hinges 62 and 63 to the straight rail portions 30 and 31 of the section 23. The hinges 62 and 63 include portions altogether similar to the structure of the hinge 75 after described, and the pivot points 65 of the hinges 62 and 63 are located at a greater distance from the plane of the bed or from the adjacent rail sections, than are the pivot points of the hinges 33 and 34. This arrangement of hinge pivots is provided in order that the bed sections may be folded. as is illustrated in the drawings and as will be subsequently more specifically mentioned.

The head section 20 includes a frame 70 formed analogous to the frame 25 of the foot section 21, and it includes the head cross piece 71 and the parallel side rail pieces 72 and 73. The side rail portions 72 and 73 are connected by novel hinges 75 to the rail portions 60 and 61 respectively of the intermediate rail section 22. These hinges 75 are of novel formation, differing from the hinges heretofore mentioned, in that they provide offset portions to permit the compact folding of the remaining sections between the same. To this end each hinge structure 75 includes the portions 80 and 81 respectively carried by the side rails of the sections 22 and 20, as is illustrated in Figures 10 and 11 of the drawings. In these perspective views, as well as in the cross sectional view Figure 13, the relation of details of the hinge portions 80 and 81 is shown. As all of the bed sections are of the same width, so that the side rails of the bed will be in alignment when the sections are extended, and in view of the manner in which it is desired to fold the bed sections, it is necessary to offset the hinge portions 80 and 81, by providing the respective offsets 84 and 85. Outwardly from the offset 84 a pair of spaced lugs 87 and 88 are provided, apertured at their outer ends, and adapted to receive therebetween the outwardly extending lug 89 formed on the offset 85 of the hinge portion 81; the lug 89 having an aperture therein adapted for alignment with the apertures of the lugs 87 and 88 to receive a hinge pin 90 therethrough. It is to be particularly noted that the hinge pin 90 provides a pivot axis for the bed sections 20 and 22 which is offset a greater distance from the plane of these sections when they are extended than the pivot points provided by the adjacent hinges 62 and 63.

Referring to the relation of the sections with respect to the hinge pivots, it is to be noted that all of the hinge pivots are disposed below the bed when the sections thereof are extended, so that in order to fold the bed it is necessary to fold the section 21 beneath its adjacent section 23, and then to fold the sections 21 and 23 beneath the intermediate section 22, and finally to fold the three sections 21, 22 and 23 beneath the section 20. The head rail 71 is hingedly connected by suitable bearing straps 93 upon the rear portion of the platform 15, so that the bed sections when they are located in their parallel collapsed relation may be swung in a vertical plane upwardly upon the platform, in a resting relation thereon. As the side rails of the sections are spaced for the same distance, it is to be noted that when they are collapsed, the rails at each side of the bed will be in alignment, as is illustrated in the cross sectional view in Figure 13, and the importance of providing the offsets 84 and 85 in the hinges 75 therefor becomes apparent. The head section 20 and the intermediate sections 22 and 23 are of the same length, although it is preferred that the foot section 21 be shorter than the other sections, as not to interfere with the mattress and bedding when the bed sections are collapsed.

In order to maintain the bed, when folded, in a stable relation upon the platform 15, it is preferred to provide brace arm structures 95 which consist of sections 96 pivoted at 97 to the outer ends of the side rails 72 and 73 of the head section 20, and sections 98 pivoted at 99 to the brace sections 96, and at their opposite ends pivoted at 100$^b$ to the outer margin portion of the platform 15. Two of these brace legs 95 are provided, one at each side of the bed, at the head section 20 thereof, and when the bed is in its collapsed relation upon the platform 15 the brace sections 96 and 98 are extended past dead center, to support the collapsed sections in a stable vertical relation upon the platform 15. Any suitable type of spring 100 and thin mattress 101 may be provided in connected relation within the area of the bed sections; the same being of flexible nature to permit their collapsibility according to the folding nature of the sections as has been above described, and as is illustrated in Figure 5 of the drawings. Due to the unique folding of the sections of the bed, the advantage of having the pivot points of the hinges successively spaced for greater distances from the plane of the bed when extended becomes apparent.

Ordinarily the platform 15 furnishes the support for the head of the bed, although any approved type of collapsible leg structure 100$^a$ may be provided in lieu of the bearing straps 93, if it is desired to support the bed otherwise than upon the vehicle platform 15. At the foot of the bed a pair of collapsible legs 105 are preferably provided, which may be of angle iron, and hingedly secured, as at 106, to a portion 107 of the bed section 21 which is secured rigid with the frame 25 thereof. A detachable brace 108 may be provided for maintaining these legs 105 in an extended relation, substantially as is illustrated in Figure 7 of the drawings.

For the bed in its collapsed relation a dustproof covering 110 may be provided, as is illustrated in Figure 4 of the drawings, which may be of the snap clasp type, easily placed over the collapsed bed sections, and simulating a luggage carrier when so disposed thereover.

When the bed is extended a suitable covering C may be provided, of any approved formation, including the side flaps 115 and 116, the latter of which may open. These side flaps may be connected in any approved manner, as by snap fasteners 117 to the body of the vehicle, and the roof thereof, and a roof covering 118 may be provided as a part of the tent or canopy.

A novel spring tightening means is provided, including an end rail 120 to which the spring is connected, which is slidable with respect to the bed frame and which may be of any material, preferably a shallow angle iron, with the ends thereof resting on the rail portions 27 and 28 of the frame section 21. It is preferred to provide adjusting screws 122, adjustably carried in screw threaded sockets provided in supporting sleeves 123 which are riveted or otherwise securely attached upon the top of the spring frame 26. At the outer end of the section 21 the screw threaded bolts 122 are provided with heads 124 rigid therewith by means of which to adjustably rotate the bolts. The bolts at their opposite ends are preferably provided with a pair of fixed spaced nuts or shoulders 129 and 130, which receive a portion of the cross bar 120 therebetween to permit rotation of the bolts with respect to the cross bar so that as the bolts 122 are adjusted along the internally screw threaded sleeves 123, the cross bar 120 will be moved toward or away from the section bar 26 to tighten or loosen the spring of the bed.

From the foregoing description of this invention it is apparent that a novel type of bed has been provided, which is especially well adapted for use by tourists upon touring cars; and which will fold in a novel and compact relation rearwardly thereof in an out of the way relation.

Various changes in the shape, size, and arrangement of parts may be made to the form of invention herein shown and described, without departing from the spirit of this invention or the scope of the claims.

I claim:

1. A collapsible bed comprising more than three sections each including side rail portions hingedly connected together so that when the sections are extended the rails will be in alignment at each side of the bed, said hinges including pivot points all offset to the same side of the plane of the bed which are successively disposed at greater distances from the rails from one end of the bed toward the other when it is extended.

2. In a folding bed four sections, and hinges connecting the sections so that all of the pivot points of the hinges are below the bed sections when the latter are extended and disposed at successively greater distances from the plane of bed sections from one end of the bed toward the other when it is extended, whereby the bed sections may be collapsed successively from one end of the bed to the other and folded beneath adjacent sections in a compact substantially parallel relation.

3. In a folding bed of the class described a head section including a U-shaped tubular frame, a foot section including a U-shaped tubular frame, and intermediate sections including straight side rails, the side rails of said intermediate sections being hingedly connected together below said rails, hinges connecting the rails of one intermediate section to the frame of the foot section, and hinges pivotally connecting the rails of another intermediate section to the frame of the head section, the pivot points of said hinges being disposed below the bed when the sections are extended, projection means carried upon certain of said sections for insertion in sockets provided in adjacent sections whereby to stably connect the frames and rails of said sections, and means for supporting said sections, said sections being pivotally connected below the normal plane of the bed when it is extended so that the foot section may be folded beneath its adjacent intermediate section and said intermediate section and the foot section then folded beneath another intermediate section, and said foot section and the two intermediate sections then folded beneath the head section to position said sections in compact substantially parallel relation.

4. In a folding bed the combination of a plurality of sections each including side rails, hinges connecting said side rails so that when the sections are extended the side rails at each side of the bed will be in alignment, said hinges each including leaf portions connected to the rails of adjacent sections, said leaves of each hinge having an offset pivot point below the bed sections when the bed is extended, said pivot connections of the hinges being successively so offset in farther spaced relation from one end of the bed to the other, and certain of said hinges being laterally offset from the outer side edges of said side rails of the sections whereby to permit collapsing of the bed sections in substantially parallelism.

5. In combination with an automobile having a horizontal platform extending rearwardly thereof, a collapsible bed including a plurality of sections with end sections and intermediate sections, means connecting said sections together so that they may be collapsed in substantial parallelism, one of said end sections having a right angled foot extension rigid thereon, means hingedly connecting said end sections with said foot extension upon said platform whereby upon collapsing of said end section into vertical position on the platform the foot extension will abut the platform to limit the amplitude of movement of said section upon the platform, and a collapsible brace structure including a pair of sections pivotally connected together, one of said sections being pivotally mounted on said platform in spaced relation to the pivotal mounting of said end section on said platform, the other section of said collapsible brace being pivotally connected adjacent the free end of that end section which is pivoted upon said platform, whereby when said sections are collapsed in vertical parallel position upon the platform the collapsible brace means will be diagonally extended for supporting said bed sections in position upon said platform.

6. In a device of the class described the combination with an automobile including a stationary supporting platform, a bed including a plurality of collapsible sections, means pivotally connecting one of said sections upon the top surface of said platform in a spaced relation inwardly of the outer edge of said platform so that when the sections are collapsed they may be positioned in a vertical plane upon the platform in non-projecting relation beyond the outer edge of said platform, and a collapsible and extensible brace arm pivotally connected upon said platform adjacent the outer edge thereof and at its opposite end pivotally connected adjacent the outer swinging end of that section of the bed which is pivotally connected to the platform as above mentioned.

JOSEPH H. McMANUS.